United States Patent
Xie et al.

(10) Patent No.: US 12,212,474 B2
(45) Date of Patent: Jan. 28, 2025

(54) BOOTSTRAPPING AN ENCRYPTED SINGLE NODE VSAN CLUSTER

(71) Applicant: VMware LLC, Palo Alto, CA (US)

(72) Inventors: Tao Xie, Shanghai (CN); Ruiling Dou, Shanghai (CN); Wenguang Wang, Santa Clara, CA (US); Zongliang Li, Shanghai (CN); Zhao Jin, Shanghai (CN)

(73) Assignee: VMware LLC, Palo Alto, CA (US)

( * ) Notice: Subject to any disclaimer, the term of this patent is extended or adjusted under 35 U.S.C. 154(b) by 303 days.

(21) Appl. No.: 17/954,431

(22) Filed: Sep. 28, 2022

(65) Prior Publication Data
US 2023/0421462 A1 Dec. 28, 2023

(30) Foreign Application Priority Data
Jun. 22, 2022 (WO) ................ PCT/CN2022/100364

(51) Int. Cl.
*H04L 41/40* (2022.01)
*H04L 9/08* (2006.01)
*H04L 41/342* (2022.01)

(52) U.S. Cl.
CPC ............ *H04L 41/40* (2022.05); *H04L 9/0822* (2013.01); *H04L 41/342* (2022.05)

(58) Field of Classification Search
CPC ........ H04L 41/40; H04L 41/34; H04L 9/0822
See application file for complete search history.

(56) References Cited

U.S. PATENT DOCUMENTS

| | | | |
|---|---|---|---|
| 2009/0252330 A1* | 10/2009 | Patnala | H04L 9/0822 380/279 |
| 2019/0229902 A1* | 7/2019 | Zheng | H04L 9/0861 |
| 2021/0266147 A1* | 8/2021 | Zee | H04L 9/3268 |

* cited by examiner

*Primary Examiner* — Kevin Bechtel
*Assistant Examiner* — Forrest L Carey
(74) *Attorney, Agent, or Firm* — Quarles & Brady LLP

(57) ABSTRACT

The present disclosure relates to bootstrapping an encrypted single node VSAN cluster. One method includes receiving a request to create an encrypted VSAN cluster from a single host in a software-defined datacenter, deploying a virtual server on a VSAN datastore of the software-defined datacenter, registering a native key provider (NKP) in the virtual server, creating an empty VSAN cluster encrypted by the NKP, adding the single host to the encrypted empty cluster to create a one-host encrypted cluster, registering a KMIP KMS in the virtual server, switching encryption of the one-host encrypted cluster from the NKP to the KMIP KMS, and adding another host to the one-host encrypted cluster to create the encrypted cluster.

20 Claims, 4 Drawing Sheets

BOOTSTRAPPING AN ENCRYPTED SINGLE NODE VSAN CLUSTER

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may utilize data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines and containers, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software-defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

DETAILED DESCRIPTION

Figure 1:
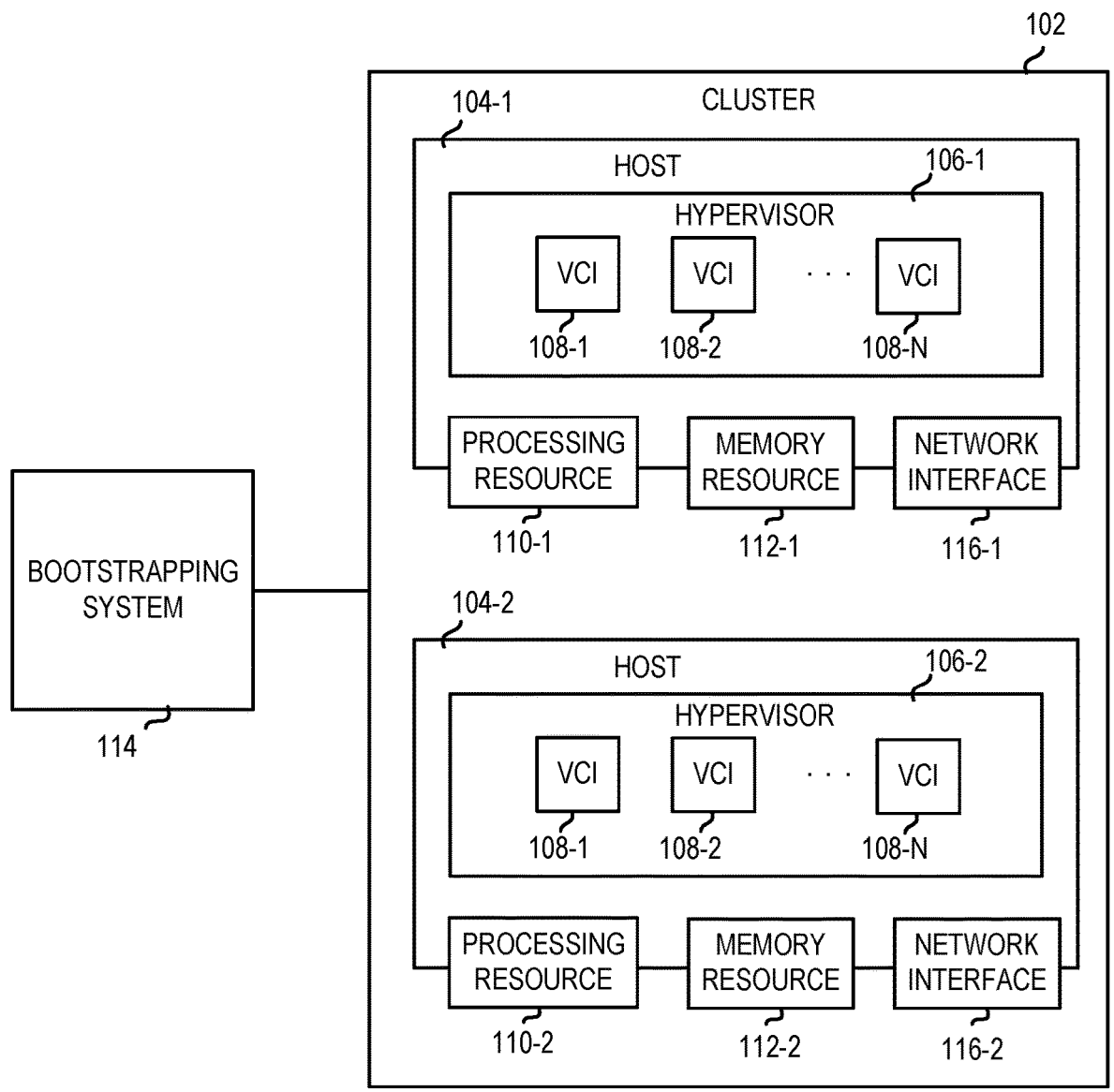
FIG. 1 is a diagram of a host and a system for bootstrapping an encrypted single node VSAN cluster according to one or more embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

A virtual storage area network (VSAN) is a logical representation of a physical storage area network. A VSAN abstracts the storage-related operations from the physical storage layer, and provides shared storage access to the applications and VCIs by combining the servers' local storage over a network into a single or multiple storage pools. A VSAN operates as a dedicated piece of software responsible for storage access and can run either as a virtual storage appliance (VSA), a storage controller that runs inside an isolated VCI or as an ordinary user-mode application. A VSAN can be implemented as a kernel-mode loadable module. A VSAN can be tied to a specific hypervisor, known as hypervisor-dedicated, or it can allow different hypervisors, known as hypervisor-agnostic. A virtual server, such as vCenter, for instance, can be a VCI on the VSAN datastore used to administer hosts in a cluster. A virtual server can be hosted on a VSAN cluster.

A VSAN cluster (e.g., an unencrypted VSAN cluster) can be created from a single host. Typically, the steps involved, as known to those of skill in the art, can include enabling VSAN on a single host, deploying a virtual server (e.g., vCenter) on the VSAN datastore, creating an empty VSAN cluster in the virtual server, adding the host into the cluster, and adding additional hosts to the cluster. However, if a user desires or requires that the VSAN cluster be data-at-rest encryption enabled with a Key Management Interoperability Protocol (KMIP)-compliant Key Management Server (KMS) (referred to herein as a "KMIP KMS"), the process is less simple. In some cases, data conversion may need to be performed before additional hosts are added to the cluster. For instance, a KMS can be set up in the virtual server and encryption can be enabled on a VSAN cluster with the KMS. Internally, VSAN service in the virtual server can create a Key Encryption Key (KEK) on the KMS and push the Key ID to each host in the cluster. Each host can use the key to encrypt a Data Encryption Key (DEK) to encrypt VSAN data. VSAN can run a Disk Format Conversion (DFC) to change existing data (e.g., the data of the virtual server VCI) from unencrypted to encrypted.

Under these previous approaches, VSAN and encryption cannot be enabled on the single node together, because a virtual server is required to generate the key. Stated differently, on one hand, VSAN is required in order to deploy a virtual server, and, on the other hand, the virtual server is required in order to set up an encryption-enabled VSAN. As discussed above, previous approaches enable VSAN first without encryption and run DFC after the virtual server is deployed. DFC goes over the VSAN disks, evacuates unencrypted data from the disks, and writes encrypted data to the disks. All these steps involve undesirable data movement. Moreover, to provide security against a potential hacker restoring data from the VSAN disks, all the disks are securely wiped in DFC, which is time consuming and affects customer workloads.

Embodiments of the present disclosure can enable VSAN and encryption on a single node from the beginning and avoid the expensive process of DFC. As will be discussed in further detail below, a native key provider (NKP) can be used to enable VSAN encryption as an intermediate step. After VSAN is operational and the virtual server is deployed, embodiments herein can leverage a shallow rekey to switch over to a KMIP KMS. Since a shallow rekey only changes the KEK (and not the DEK), data movement is virtually negligible compared to previous approaches. Avoiding DFC saves embodiments herein both time and computing resources.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Analogous elements within a Figure may be referenced with a hyphen and extra numeral or letter. Such analogous elements may be generally referenced without the hyphen and extra numeral or letter. For example, elements 108-1, 108-2, and 108-N in FIG. 1 may be collectively referenced as 108. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a diagram of a host and a system for bootstrapping an encrypted single node VSAN cluster according to one or more embodiments of the present disclosure. The system can include a cluster 102 in communication with a bootstrapping system 114. The cluster 102 can include a first host 104-1 with processing resources 110-1 (e.g., a number of processors), memory resources 112-1, and/or a network interface 116-1. Similarly, the cluster 102 can include a second host 104-2 with processing resources 110-2, memory resources 112-2, and/or a network interface 116-2. Though two hosts are shown in FIG. 1 for purposes of illustration, embodiments of the present disclosure are not limited to a particular number of hosts. For purposes of clarity, the first host 104-1 and/or the second host 104-2 (and/or additional hosts not illustrated in FIG. 1) may be generally referred to as "host 104." Similarly, reference is made to "hypervisor 106," "VCI 108," "processing resources 110," memory resources 112," and "network interface 116," and such usage is not to be taken in a limiting sense.

The host 104 can be included in a software-defined data center. A software-defined data center can extend virtualization concepts such as abstraction, pooling, and automation to data center resources and services to provide information technology as a service (ITaaS). In a software-defined data center, infrastructure, such as networking, processing, and security, can be virtualized and delivered as a service. A software-defined data center can include software-defined networking and/or software-defined storage. In some embodiments, components of a software-defined data center can be provisioned, operated, and/or managed through an application programming interface (API).

The host 104-1 can incorporate a hypervisor 106-1 that can execute a number of VCIs 108-1, 108-2, . . . , 108-N (referred to generally herein as "VCIs 108"). Likewise, the host 104-2 can incorporate a hypervisor 106-2 that can execute a number of VCIs 108. The hypervisor 106-1 and the hypervisor 106-2 are referred to generally herein as a hypervisor 106. The VCIs 108 can be provisioned with processing resources 110 and/or memory resources 112 and can communicate via the network interface 116. The processing resources 110 and the memory resources 112 provisioned to the VCIs 108 can be local and/or remote to the host 104. For example, in a software-defined data center, the VCIs 108 can be provisioned with resources that are generally available to the software-defined data center and not tied to any particular hardware device. By way of example, the memory resources 112 can include volatile and/or non-volatile memory available to the VCIs 108. The VCIs 108 can be moved to different hosts (not specifically illustrated), such that a different hypervisor manages (e.g., executes) the VCIs 108. The host 104 can be in communication with the bootstrapping system 114. In some embodiments, the bootstrapping system 114 can be deployed on a server, such as a web server.

The bootstrapping system 114 can include computing resources (e.g., processing resources and/or memory resources in the form of hardware, circuitry, and/or logic, etc.) to perform various operations to bootstrap an encrypted single node VSAN cluster, as described in more detail herein. Accordingly, in some embodiments, the bootstrapping system 114 can be part of a cluster controller (e.g., a vSAN cluster manager). In embodiments in which the bootstrapping system 114 is part of a vSAN cluster controller, the local disks of the hosts 104-1 and 104-2 can act as pooled storage for the cluster 102 (e.g., a datastore) that can store data corresponding to the VCIs 108-1, . . . , 108-N.

Figure 2:
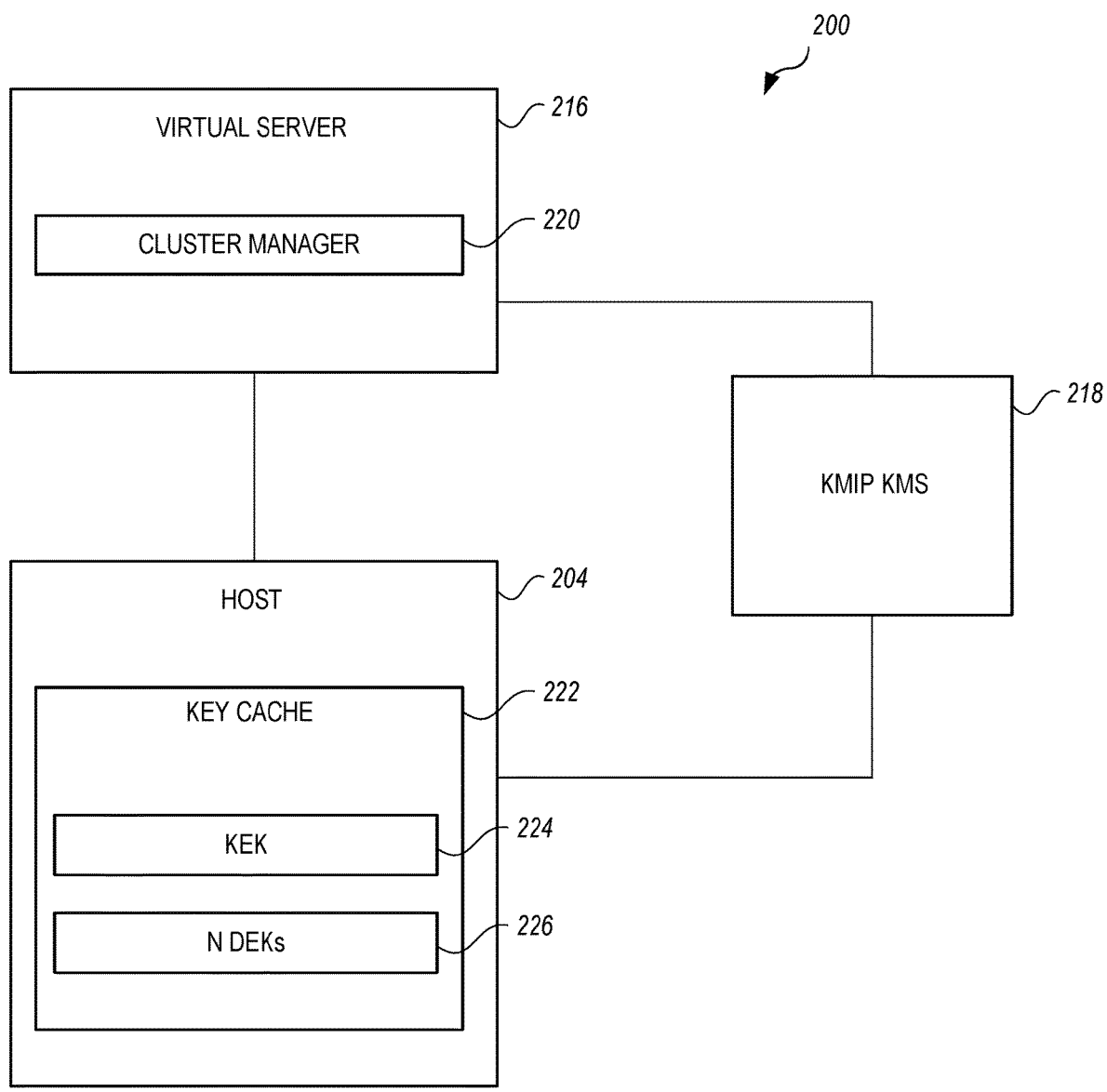
FIG. 2 is a block diagram illustrating a system for bootstrapping an encrypted single node VSAN cluster according to one or more embodiments of the present disclosure.

FIG. 2 is a block diagram illustrating a system for bootstrapping an encrypted single node VSAN cluster according to one or more embodiments of the present disclosure. The system 200 includes a virtual server 216, a KMIP KMS 218, and a host 204.

In an example, the virtual server 216 can be vCenter server, though embodiments of the present disclosure are not so limited. The virtual server 216 can be a preconfigured VCI used to administer hosts in a cluster (e.g., the host 204). The virtual server 216 can be hosted on a VSAN cluster. The virtual server 216 can include a cluster manager 220. In some embodiments, the cluster manager 220 is a distributed layer of software that runs natively as a part of a hypervisor (discussed above in connection with FIG. 1). The cluster manager 220 can aggregate local or direct-attached capacity devices of a host cluster and create a single storage pool shared across all hosts in a cluster.

The KMIP KMS 218 is a computing device or system that receives and serves cryptographic keys to users and/or other programs. The KMIP KMS 218 utilizes KMIP, which is an extensible communication protocol that defines message formats for the manipulation of cryptographic keys on the KMIP KMS 204. The KMIP KMS 218 is provided by a source external to the SDDC (e.g., a trusted third party). The host 204 can be analogous to the hosts 104 described above in connection with FIG. 1. The host 204 can include a key cache 222, which can contain a KEK and a plurality (e.g., N quantity) of DEKs.

Figure 3:
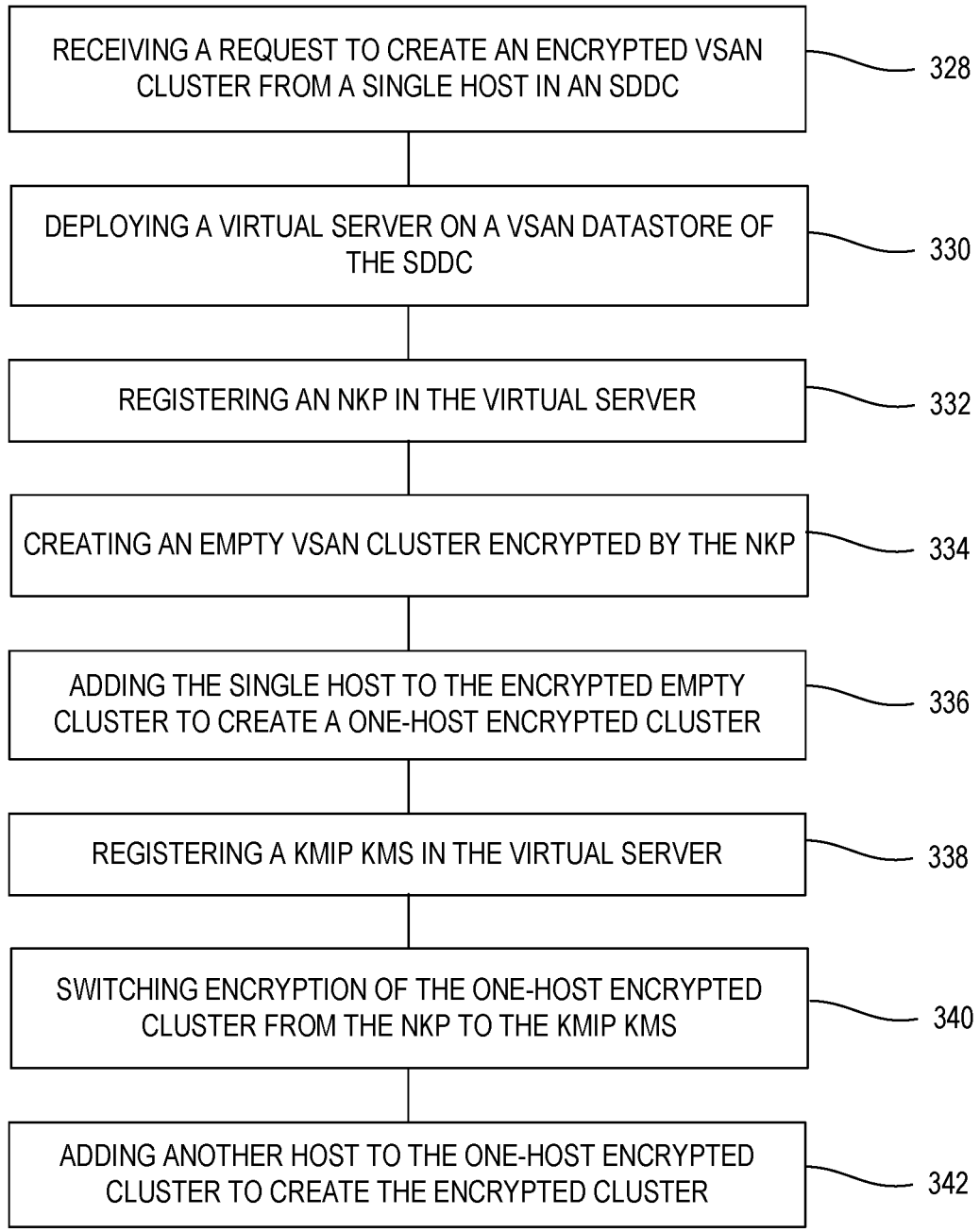
FIG. 3 illustrates a method of bootstrapping an encrypted single node VSAN cluster according to one or more embodiments of the present disclosure.

FIG. 3 illustrates a method of bootstrapping an encrypted single node VSAN cluster according to one or more embodiments of the present disclosure. The method includes, at 328, receiving a request to create an encrypted VSAN cluster from a single host in a software-defined datacenter. The request can be received from a user interface and/or platform for managing a virtualized environment (e.g., vSphere), for instance, though embodiments herein are not so limited. In some embodiments, the virtual server can include an NKP. The virtual server can generate a primary key and push the primary key to all hosts in the cluster. This primary key is referred to herein as a "key derivation key" (KDK). The hosts then generate keys for application use, even in cases where they are not connected to the virtual server, to enable security functionality. Using the NKP, embodiments herein can create a random KDK and use it on a single host directly. Accordingly, the dependency on the virtual server in enabling encryption with KMIP KMS, which presents challenges in previous approaches, can be eliminated. With the NKP on the single host, VSAN and encryption can be enabled together.

The method includes, at 330, deploying a virtual server on a VSAN datastore of the software-defined datacenter. Upon deployment, the data for the virtual server is encrypted. The method includes, at 332, registering an NKP in the virtual server. As a result, the virtual server and the NKP have a trust relationship. The NKP can generate a KEK, which encrypts DEKs that encrypt VSAN data. The method includes, at 334, creating an empty VSAN cluster encrypted by the NKP. The method includes, at 336, adding the single host to the encrypted empty cluster to create a one-host encrypted cluster. The method includes, at 338, registering a KMIP KMS in the virtual server. As a result, the virtual server and the KMIP KMS have a trust relationship. The KMIP KMS can be specified by the user (e.g., customer). Stated differently, a user input can identify and/or specify the KMIP KMS. The method includes, at 340, switching encryption of the one-host encrypted cluster from the NKP to the KMIP KMS. Internally, the cluster manager can perform a shallow rekey. The shallow rekey can generate a KEK on the KMIP KMS to replace the previous KEK generated by the NKP. The DEKs in the key cache remain unchanged and, as a result, data is not moved. The NKP may be invisible from the user's perspective and can be destroyed after the switch to the KMIP KMS is completed. Thus, from the user's point of view, a single node encrypted VSAN cluster is created. The method includes, at 342, adding another host to the one-host encrypted cluster to create the encrypted cluster. Hosts can be added responsive to inputs into a user interface, for instance. Data is encrypted from the beginning and no data needs to be moved afterwards.

Figure 4:
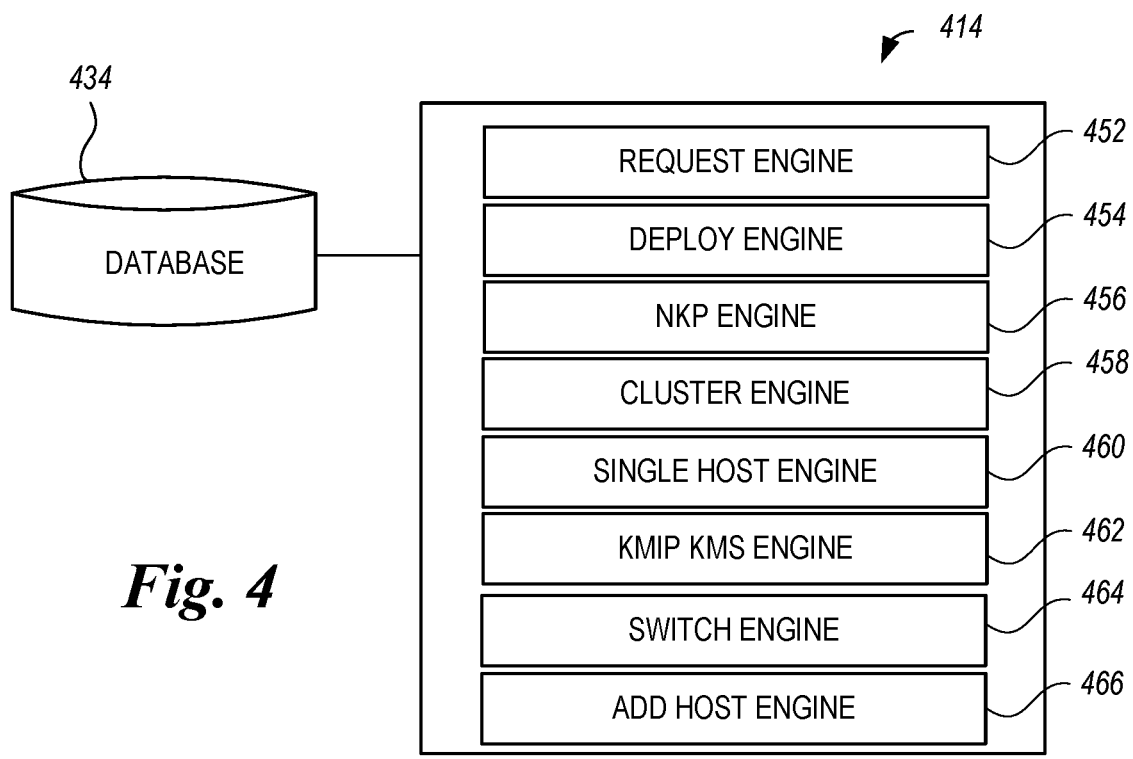
FIG. 4 is a diagram of a system for bootstrapping an encrypted single node VSAN cluster according to one or more embodiments of the present disclosure.

FIG. 4 is a diagram of a system 414 for bootstrapping an encrypted single node VSAN cluster according to one or more embodiments of the present disclosure. The system 414 can include a database 450 and/or a number of engines, for example request engine 452, deploy engine 454, NKP engine 456, cluster engine 458, single host engine 460, KMIP KMS engine 462, switch engine 464, and/or add host engine 466, and can be in communication with the database 450 via a communication link. The system 414 can include additional or fewer engines than illustrated to perform the various functions described herein. The system can represent program instructions and/or hardware of a machine (e.g., machine 568 as referenced in FIG. 5, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the request engine 452 can include a combination of hardware and program instructions that is configured to receive a request to create an encrypted VSAN cluster from a single host in a software-defined datacenter. In some embodiments, the deploy engine 454 can include a combination of hardware and program instructions that is configured to deploy a virtual server on a VSAN datastore of the software-defined datacenter. In some embodiments, the NKP engine 456 can include a combination of hardware and program instructions that is configured to register an NKP in the virtual server. In some embodiments, the cluster engine 458 can include a combination of hardware and program instructions that is configured to create an empty VSAN cluster encrypted by the NKP. In some embodiments, the single host engine 460 can include a combination of hardware and program instructions that is configured to add the single host to the encrypted empty cluster to create a one-host encrypted cluster. In some embodiments, the KMIP KMS engine 462 can include a combination of hardware and program instructions that is configured to register a KMIP KMS in the virtual server. In some embodiments, the switch engine 464 can include a combination of hardware and program instructions that is configured to switch encryption of the one-host encrypted cluster from the NKP to the KMIP KMS. In some embodiments, the add host engine 466 can include a combination of hardware and program instructions that is configured to add another host to the one-host encrypted cluster to create the encrypted cluster.

Figure 5:
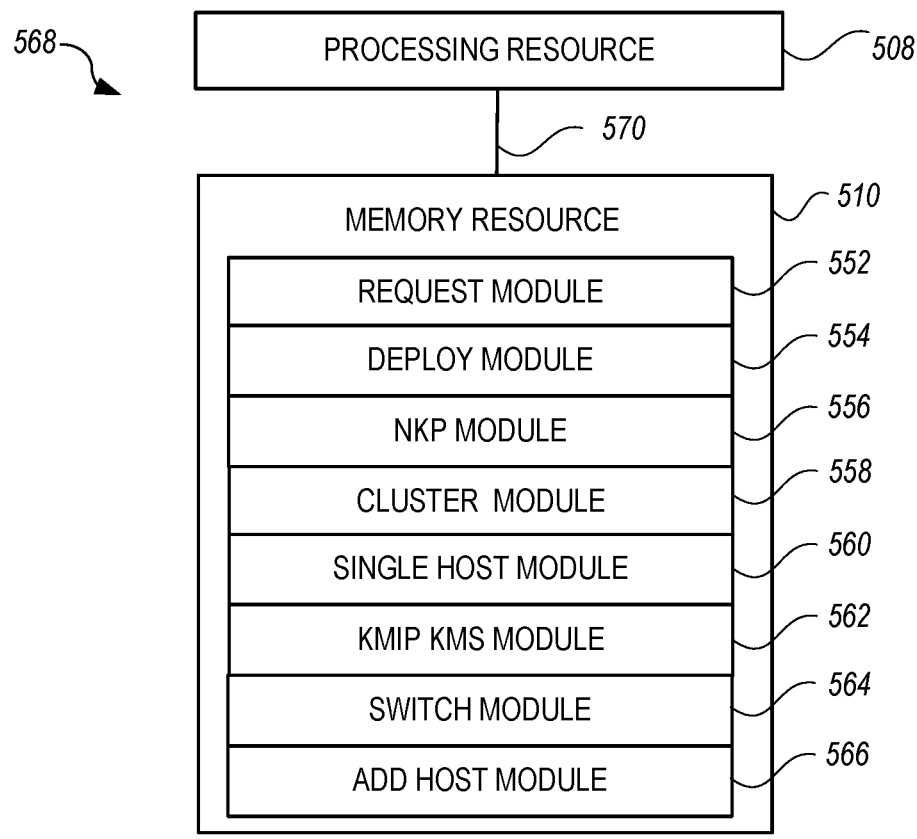
FIG. 5 is a diagram of a machine for bootstrapping an encrypted single node VSAN cluster according to one or more embodiments of the present disclosure.

FIG. 5 is a diagram of a machine for bootstrapping an encrypted single node VSAN cluster according to one or more embodiments of the present disclosure. The machine 568 can utilize software, hardware, firmware, and/or logic to perform a number of functions. The machine 568 can be a combination of hardware and program instructions configured to perform a number of functions (e.g., actions). The hardware, for example, can include a number of processing resources 508 and a number of memory resources 510, such as a machine-readable medium (MRM) or other memory resources 510. The memory resources 510 can be internal and/or external to the machine 568 (e.g., the machine 568 can include internal memory resources and have access to external memory resources). In some embodiments, the machine 568 can be a VCI. The program instructions (e.g., machine-readable instructions (MM)) can include instructions stored on the MRM to implement a particular function (e.g., an action such as registering an NKP, as described herein). The set of MRI can be executable by one or more of the processing resources 508. The memory resources 510 can be coupled to the machine 568 in a wired and/or wireless manner. For example, the memory resources 510 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 510 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 508 can be coupled to the memory resources 510 via a communication path 570. The communication path 570 can be local or remote to the machine 568. Examples of a local communication path 570 can include an electronic bus internal to a machine, where the memory resources 510 are in communication with the processing resources 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 570 can be such that the memory resources 510 are remote from the processing resources 508, such as in a network connection between the memory resources 510 and the processing resources 508. That is, the communication path 570 can be a network connection. Examples of such a network connection can include a local area network (LAN), wide area network (WAN), personal area network (PAN), and the Internet, among others.

As shown in FIG. 5, the MRI stored in the memory resources 510 can be segmented into a number of modules 552, 554, 556, 558, 560, 562, 564, 566 that when executed by the processing resources 508 can perform a number of functions. As used herein a module includes a set of instructions included to perform a particular task or action. The number of modules 552, 554, 556, 558, 560, 562, 564, 566 can be sub-modules of other modules. For example, the KMIP KMS module 562 can be a sub-module of the NKP module 556 and/or can be contained within a single module. Furthermore, the number of modules 552, 554, 556, 558, 560, 562, 564, 566 can comprise individual modules separate and distinct from one another. Examples are not limited to the specific modules 552, 554, 556, 558, 560, 562, 564, 566 illustrated in FIG. 5.

Each of the number of modules 552, 554, 556, 558, 560, 562, 564, 566 can include program instructions and/or a combination of hardware and program instructions that, when executed by a processing resource 508, can function as a corresponding engine as described with respect to FIG. 4. For example, the request module 552 can include program instructions and/or a combination of hardware and program instructions that, when executed by a processing resource 508, can function as the request engine 452, though embodiments of the present disclosure are not so limited.

The machine 568 can include a request module 552, which can include instructions to receive a request to create an encrypted VSAN cluster from a single host in a software-defined datacenter. The machine 568 can include a deploy module 554, which can include instructions to deploy a virtual server on a VSAN datastore of the software-defined datacenter. The machine 568 can include an NKP module 556, which can include instructions to register an NKP in the virtual server. The machine 568 can include a cluster module 558, which can include instructions to create an empty VSAN cluster encrypted by the NKP. The machine 568 can include a single host module 560, which can include instructions to add the single host to the encrypted empty cluster to create a one-host encrypted cluster. The machine 568 can include a KMIP KMS module 562, which can include instructions to register a KMIP KMS in the virtual server. The machine 568 can include a switch module 564, which can include instructions to switch encryption of the one-host encrypted cluster from the NKP to the KMIP KMS. The machine 568 can include an add host module 566, which can include instructions to add another host to the one-host encrypted cluster to create the encrypted cluster.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    receiving a request to create an encrypted virtual storage area network (VSAN) cluster from a single host in a software-defined datacenter;
    deploying a virtual server on a VSAN datastore of the software-defined datacenter, wherein the VSAN datastore is encrypted with a native key provider (NKP);

registering the NKP in the virtual server;
creating an empty VSAN cluster encrypted by the NKP;
adding the single host to the encrypted empty cluster to create a one-host encrypted cluster;
registering a Key Management Interoperability Protocol-compliant Key Management Server (KMIP KMS) in the virtual server;
switching encryption of the one-host encrypted cluster from the NKP to the KMIP KMS; and
adding another host to the one-host encrypted cluster to create the encrypted cluster.

2. The method of claim 1, wherein the method includes generating, by the virtual server, a random Key Derivation Key (KDK) and pushing the random KDK to the single host.

3. The method of claim 1, wherein switching encryption of the one-host encrypted cluster from the NKP to the KMIP KMS includes performing a shallow rekey.

4. The method of claim 3, wherein performing the shallow rekey includes:
generating a Key Encryption Key (KEK) by the KMIP KMS; and
replacing a previous KEK generated by the NKP with the KEK generated by the KMIP KMS.

5. The method of claim 1, wherein the method includes leaving unchanged any Data Encryption Keys used to encrypt VSAN data.

6. The method of claim 1, wherein the method includes receiving a user indication that identifies the KMIP KMS.

7. The method of claim 1, wherein the NKP is provided by the software-defined datacenter and wherein the KMIP KMS is provided by an external source.

8. A non-transitory machine-readable medium having instructions stored thereon which, when executed by a processor, cause the processor to:
receive a request to create an encrypted virtual storage area network (VSAN) cluster from a single host in a software-defined datacenter;
deploy a virtual server on a VSAN datastore of the software-defined datacenter, wherein the VSAN datastore is encrypted with a native key provider (NKP);
register the NKP in the virtual server;
create an empty VSAN cluster encrypted by the NKP;
add the single host to the encrypted empty cluster to create a one-host encrypted cluster;
register a Key Management Interoperability Protocol-compliant Key Management Server (KMIP KMS) in the virtual server;
switch encryption of the one-host encrypted cluster from the NKP to the KMIP KMS; and
add another host to the one-host encrypted cluster to create the encrypted cluster.

9. The medium of claim 8, including instructions to generate, by the virtual server, a random Key Derivation Key (KDK) and pushing the random KDK to the single host.

10. The medium of claim 8, wherein the instructions to switch encryption of the one-host encrypted cluster from the NKP to the KMIP KMS include instructions to perform a shallow rekey.

11. The medium of claim 10, wherein the instructions to perform the shallow rekey include instructions to:
generate a Key Encryption Key (KEK) by the KMIP KMS; and
replace a previous KEK generated by the NKP with the KEK generated by the KMIP KMS.

12. The medium of claim 8, wherein including instructions to leave unchanged any Data Encryption Keys used to encrypt VSAN data.

13. The medium of claim 8, including instructions to receive a user indication that identifies the KMIP KMS.

14. The medium of claim 8, wherein the NKP is provided by the software-defined datacenter and wherein the KMIP KMS is provided by an external source.

15. A system, comprising:
a processor; and
a non-transitory computer readable medium having instructions stored thereon which, when executed by the processor, cause the processor to:
receive a request to create an encrypted virtual storage area network (VSAN) cluster from a single host in a software-defined datacenter;
deploy a virtual server on a VSAN datastore of the software-defined datacenter, wherein the VSAN datastore is encrypted with a native key provider (NKP);
register the NKP in the virtual server;
create an empty VSAN cluster encrypted by the NKP;
add the single host to the encrypted empty cluster to create a one-host encrypted cluster;
register a Key Management Interoperability Protocol-compliant Key Management Server (KMIP KMS) in the virtual server;
switch encryption of the one-host encrypted cluster from the NKP to the KMIP KMS; and
add another host to the one-host encrypted cluster to create the encrypted cluster.

16. The system of claim 15, wherein the instructions further cause the processor to generate, by the virtual server, a random Key Derivation Key (KDK) and pushing the random KDK to the single host.

17. The system of claim 15, wherein the instructions further cause the processor to perform a shallow rekey to switch encryption of the one-host encrypted cluster from the NKP to the KMIP KMS.

18. The system of claim 17, wherein the instructions further cause the processor to:
generate a Key Encryption Key (KEK) by the KMIP KMS; and
replace a previous KEK generated by the NKP with the KEK generated by the KMIP KMS.

19. The system of claim 15, wherein the system is configured to leave unchanged any Data Encryption Keys used to encrypt VSAN data.

20. The system of claim 15, wherein the instructions further cause the processor to receive a user indication that identifies the KMIP KMS.

* * * * *